US010387654B2

(12) United States Patent
Loehr et al.

(10) Patent No.: US 10,387,654 B2
(45) Date of Patent: Aug. 20, 2019

(54) METHOD AND DEVICE FOR PROVIDING A COMPUTER PROGRAM

(71) Applicant: Robert Bosch GmbH, Stuttgart (DE)

(72) Inventors: Hans Loehr, Stuttgart (DE); Herve Seudie, Moensheim (DE); Paulius Duplys, Markgroeningen (DE); Robert Szerwinski, Stuttgart (DE); Sebastien Leger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 15/416,738

(22) Filed: Jan. 26, 2017

(65) Prior Publication Data

US 2017/0220803 A1 Aug. 3, 2017

(30) Foreign Application Priority Data

Jan. 28, 2016 (DE) ........................ 10 2016 201 262

(51) Int. Cl.
*G06F 21/00* (2013.01)
*G06F 21/57* (2013.01)
*G06F 8/41* (2018.01)

(52) U.S. Cl.
CPC .............. *G06F 21/577* (2013.01); *G06F 8/41* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 2005/0271202 | A1* | 12/2005 | Shu | G06F 9/3001 380/29 |
| 2008/0091975 | A1* | 4/2008 | Kladko | G06F 11/277 714/25 |
| 2008/0126766 | A1* | 5/2008 | Chheda | G06F 9/30003 712/226 |
| 2014/0075203 | A1* | 3/2014 | Barbu | G06F 7/723 713/189 |
| 2015/0317475 | A1* | 11/2015 | Aguayo Gonzalez | G06F 21/55 726/23 |
| 2016/0140340 | A1* | 5/2016 | Walters | G06F 21/556 726/22 |
| 2016/0275288 | A1* | 9/2016 | Sethumadhavan | G06F 21/566 |
| 2018/0004944 | A1* | 1/2018 | Nagata | G01R 31/28 |

OTHER PUBLICATIONS

Advanced Encryption Standard (AES), Federal Information, Processing Standards Publication 197, Nov. 26, 2001, http://csrc:nist.gov/publications/fip/fips197/fips-197.pdf).

* cited by examiner

*Primary Examiner* — Shin-Hon (Eric) Chen
(74) *Attorney, Agent, or Firm* — Norton Rose Fulbright US LLP; Gerard Messina

(57) ABSTRACT

A method for providing a computer program for a computing unit of an electronic device, in particular a control device of a motor vehicle or of a household appliance, wherein the method includes: evaluation of properties of the electronic device relating to a susceptibility to side channel attacks and/or fault attacks, as a result of which an evaluation result is obtained, selection of at least one influencing parameter that has an influence on the susceptibility of the electronic device to side channel attacks and/or fault attacks, in particular as a function of the evaluation result, use of the at least one influencing parameter to diversify the computer program for the computing unit.

13 Claims, 3 Drawing Sheets

METHOD AND DEVICE FOR PROVIDING A COMPUTER PROGRAM

RELATED APPLICATION INFORMATION

The present application claims priority to and the benefit of German patent application no. 10 2016 201 262.2, which was filed in Germany on Jan. 28, 2016, the disclosure of which is incorporated herein by reference.

FIELD OF THE INVENTION

The present invention relates to a method for providing a computer program for a computing unit of an electronic device, in particular a control device of a motor vehicle or of a household appliance. The computing unit of such an electronic device can for example be fashioned as a microcontroller, microprocessor or processor, digital signal processor, or the like. In addition, the computing unit can also have a programmable logic module (e.g. FPGA, or field programmable gate array), configured for example for the implementation of the functionality of a processor. The computing unit standardly controls one or more functions, or the operation, of the electronic device. For example in the field of motor vehicles, the electronic device can be fashioned as a control device for an internal combustion engine or a transmission of a motor vehicle. The present invention further relates to a device for providing a computer program for a computing unit of an electronic device.

BACKGROUND INFORMATION

It has turned out that side channel attacks (SCA) and fault attacks are efficient methods for obtaining information about data processed by computing units of electronic devices. This holds in particular for so-called embedded systems, in which the computing unit is connected directly to other functional components of an electronic device, and may be at least partly integrated therein.

Side channel attacks exploit a "leakage"—a function mostly of the processed data—of information from the electronic device or its computing unit that can be acquired in the form of physical parameters and is thus observable by, inter alia, a potential attacker. For example, an electrical consumption of energy, electromagnetic radiation or near fields of the computing unit or of the electronic device, and/or the time of execution of a block cipher by the computing unit can be evaluated during side channel attacks; in this way an attacker can, as a rule, obtain information about data processed by the computing unit, in particular also about secret keys such as those used in the application of cryptographic methods (encryption, decryption, formation of hash values, etc.).

Fault attacks enable the ascertaining of data processed by the computing unit, in particular, again, secret keys used by cryptographic methods, through the targeted introduction of faults (change in the electrical operating voltage, manipulation of clock signals, manipulation of the temperature of the computing unit and/or of the ambient temperature, charging with energy-rich radiation, in particular laser radiation and x-ray radiation) during the processing of the data by the computing unit.

SUMMARY OF THE INVENTION

Accordingly, the object of the present invention is to improve a method and a device of the type named above with the aim of providing increased security against side channel attacks and/or fault attacks.

In the method of the type named above, this object is achieved according to the present invention in that the method has the following steps: evaluation of properties of the electronic device relating to a susceptibility to side channel attacks and/or fault attacks, as a result of which an evaluation result is obtained; selection of at least one influencing parameter that has an influence on the susceptibility to side channel attacks and/or fault attacks of the electronic device, in particular as a function of the evaluation result; use of the at least one influencing parameter to diversify the computer program for the computing unit. The approach according to the present invention enables a targeted and efficient hardening of the target system for the computer program, i.e. of the electronic device having the computing unit, against side channel attacks and fault attacks. Through the diversification according to the present invention of the computer program, it can advantageously be achieved that various electronic devices according to the present invention each have different computer programs contained according to the present invention, so that the various electronic devices according to the present invention each have individual properties relating to their security or susceptibility to side channel attacks and/or fault attacks. In this way, it is advantageously ensured that, for each individual electronic device according to the present invention, in each case an individual attack is required in the sense of a side channel attack and/or fault attack. In this way, the costs and the outlay for side channel attacks and/or fault attacks against a plurality of devices according to the present invention is increased, because for each device a separate preparation phase is required for the cryptographic attacks.

In the diversification, forms for the computer program are obtained that are advantageously executable in particular by the computing unit, for example a machine code (binary code) for the computing unit. The machine code can be obtained for example by compiling a source code written in a higher-level language for the computer program, and possibly subsequent linking (binding) of the compiled modules.

In a specific embodiment, it can be provided that the step of evaluation includes a systematic evaluation of some or all factors that have an influence on the susceptibility of the electronic device to side channel attacks and/or fault attacks. Here, the target system, i.e. the electronic device, can be classified with regard to its susceptibility to side channel attacks and/or fault attacks. It will be understood that in this variant of the invention, specific aspects of the hardware of the electronic device or of its computing unit can be evaluated, for example the design of an address and/or (memory) data bus of the computing unit, or its susceptibility to side channel attacks and/or fault attacks, differences in the temporal sequence of data processing, caused for example by a cache memory of the computing unit and/or instruction reordering mechanisms (resorting of commands), and/or branch predictions.

In a specific embodiment, it is provided that the influencing parameter is at least one parameter from the following list: a parameter characterizing the architecture of the electronic device or the architecture of its computing unit; a parameter characterizing the implementation level of the electronic device or its computing unit; a parameter characterizing the production of the computer program (e.g. a build parameter relating to the compiling of a source code of the computer program written in a higher-level language or other programming language, a link parameter that influences a link process).

According to a specific embodiment, a parameter characterizing the implementation level of the electronic device or of its computing unit—related to a possible side channel leakage of a memory bus (data bus or address bus)—is for example the selection of a memory location for data to be processed between an internal (in particular cache) memory of the computing unit, to which access can thus be had without external bus accesses, and an external memory that requires bus accesses and thus may cause a side channel leakage via the bus. If the algorithm to be implemented on the computing unit provides for example the execution of a non-linear substitution operation (example: calculation of the S-boxes according to AES (Advanced Encryption Standard) ; see http://csrc.nist.gov/publications/fips/fips197/fips-197.pdf), then the parameter characterizing the implementation level can, in an advantageous specific embodiment, indicate that the memory regions containing the S-box(es) are stored in an internal, preferably cache, memory of the computing unit, so that no accesses to an external memory are required, which reduces side channel leakage. In the case of a source text of the computer program in the higher-level language C, e.g. in a comparable manner the memory allocation can be influenced by defining variables having the keyword "register," as a result of which the relevant variables are stored directly in an internal memory register of the computing unit.

In a further specific embodiment, it is provided that the computer program implements a specifiable algorithm, the diversification including the following steps: production of at least two different machine code programs that both have the same functionality regarding the algorithm to be implemented, but that differ from one another with regard to their side channel leakage and/or reactions to fault attacks. These at least two different machine code programs can be assigned to different devices according to the present invention, or to their respective computing unit, as a result of which the susceptibility of the devices to side channel attacks or fault attacks is diversified, so that for example a successful side channel attack on a first device cannot be transferred to a second device that is identically constructed except for the machine code program diversified according to the present invention.

In other words, the variant of the present invention described above enables the implementation of the specifiable algorithm (e.g. AES, other cryptographic or safety-relevant or sensitive methods) in such a way that various machine code programs (binaries) that can be executed by a computing unit of the electronic device are obtained that functionally all realize the specifiable algorithm, but that sometimes differ significantly from one another with regard to their susceptibility to side channel attacks and/or fault attacks. The design according to the present invention can therefore also be referred to as a hardening of a plurality of devices obtained according to the present invention against side channel attacks (SCA hardening), based on diversification.

If the connections between the parameters characterizing a susceptibility to side channel attacks and/or fault attacks and the source code, or the machine code programs obtainable therefrom, are sufficiently transparent, then, according to a further advantageous specific embodiment, a further diversification of the computer programs can also be applied directly to their binary form, i.e. the machine code programs, namely using patching, i.e. the subsequently targeted modifying of one or more passages of the machine code program that are associated with the parameters characterizing a susceptibility to side channel attacks and/or fault attacks. For example, it is possible to define constants in a source code of the computer program and to assign known values to these. These values are located at a corresponding location of the machine program, and there they can possibly be exchanged for other values using patching (overwriting with other values). If the parameters defined in themselves as constants in the computer program are for example used to define a memory allocation or the time sequence during bus accesses and the like, then, using the patching described above, the susceptibility of the computer program in binary form to side channel attacks and/or fault attacks can be directly influenced, and consequently a software diversification can be achieved directly in the data files that can be executed by the computing unit.

In a further preferred specific embodiment, it is provided that the diversification includes at least one of the following steps: selection of an implementation for a, or the, specifiable algorithm, the selection of the implementation taking place in particular in random or pseudo-random fashion or as a function of at least one first selection parameter; selection of a compiling parameter, the compiling parameter being included during a compilation of the computer program, the selection of the compiling parameter in particular taking place in random or pseudo-random fashion or as a function of at least one second selection parameter; selection of a compiling method for the compilation of the computer program, the selection of the compiling method taking place in particular in random or pseudo-random fashion or as a function of at least one third selection parameter. As described above, one or more of the steps named above can be used, in any combination.

In a further specific embodiment, it is provided that the diversification includes: selection of at least one runtime parameter for an execution of the computer program on the computing unit, the selection of the at least one runtime parameter taking place in particular in random or pseudo-random fashion or as a function of at least one fourth selection parameter. The runtime parameter is specified, as is generally known, at the start of the computer program, so that for each (new) start of the computer program on the computing unit other parameters can be used, and thus the SCA hardening (hardening against side channel attacks and/or fault attacks) according to the present invention can be used in a particularly flexible manner.

A further solution of the task of the present invention is indicated by a method for producing an electronic device, the electronic device being provided and having a computing unit for executing a computer program, the method according to the present invention described above being used to provide a computer program for the computing unit. The diversified computer program according to the present invention can be stored in a memory of the computing unit or of the device and executed by the computing unit.

Still another solution of the object of the present invention is indicated by a device for providing a computer program for a computing unit of an electronic device, in particular a control device of a motor vehicle or of a household appliance, characterized in that the device is fashioned to execute the following steps: evaluation of properties of the electronic device relating to a susceptibility to side channel attacks and/or fault attacks, as a result of which an evaluation result is obtained; selection of at least one influencing parameter that has an influence on the susceptibility to side channel attacks and/or fault attacks of the electronic device, in particular as a function of the evaluation result; use of the at least one influencing parameter to diversify the computer program for the computing unit. For example, the device according to the present invention can also have a computing unit or a computer, e.g. a personal computer, for the execution of the steps according to the present invention. The step of evaluation can for example be executed particularly efficiently, in particular automatically (without interaction with a human operator) if the properties that are to be evaluated of the electronic device relating to susceptibility to side channel attacks and/or fault attacks are described in a formalized fashion and accordingly can be evaluated by machine. For this purpose, for example data can be used that characterize a layout of a circuit board that has the computing unit. In addition, the influencing parameter or parameters can be contained in a parameter database. It is also conceivable to provide an expert system that, for the steps of evaluation and selection, provides relevant information concerning the automated processing.

A further solution of the object of the present invention is indicated by a method for operating an electronic device that has a computing unit for executing a computer program, characterized by the following steps: selection of at least one runtime parameter for an execution of the computer program on the computing unit that has an influence on the susceptibility of the electronic device to side channel attacks and/or fault attacks, the selection of the at least one runtime parameter taking place in particular in random or pseudorandom fashion or as a function of at least one fifth selection parameter; execution of the computer program with the at least one runtime parameter. In this variant of the invention, the computer program, or its binary form (machine code program), is designed to evaluate at least one runtime parameter that has an influence on the susceptibility of the electronic device to side channel attacks and/or fault attacks, or the computer program or its binary form (machine code program) is designed to change its execution behavior as a function of the at least one runtime parameter in such a way that a susceptibility to side channel attacks and/or fault attacks changes. Like the variant that has as its subject matter a patching of the machine code program, this variant of the invention can advantageously be executed in the field, or during a use of the electronic device in a target system.

Another solution of the object of the present invention is indicated by an electronic device having a computing unit and at least one computer program for the computing unit that can be executed on the computing unit, the at least one computer program having been obtained through the method according to the present invention, in particular according to at least one of claims 1 through 6.

Further features, possible uses, and advantages of the present invention result from the following description of exemplary embodiments of the present invention, shown in the Figures of the drawing. In this context, all described or presented features form, in themselves or in any combination, the subject matter of the present invention, independent of their summarization in the patent claims or their relations of dependence, and independent of their formulation or representation in the description or in the drawings.

DETAILED DESCRIPTION

Figure 1:
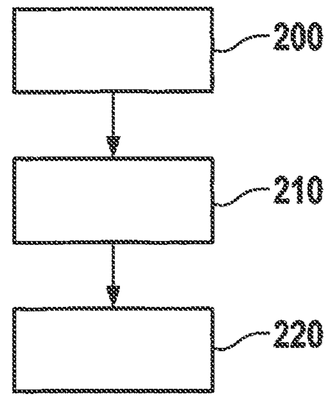
FIG. 1 schematically shows a simplified flow diagram of a specific embodiment of the method according to the present invention.

FIG. 1 schematically shows a simplified flow diagram of a specific embodiment of the method according to the present invention for providing a computer program for a computing unit of an electronic device. A specific embodiment of electronic device 100 is shown as an example in FIG. 4. Electronic device 100 has a computing unit 102 that is fashioned for example as a microcontroller, microprocessor or processor, digital signal processor, or the like. In addition, computing unit 102 can also have a programmable logic module (e.g. FPGA, or field programmable gate array) that is configured for example for the implementation of the functionality of a processor. Computing unit 102 standardly controls one or more functions or the operation of electronic device 100. For example, in the field of motor vehicles electronic device 100 can be fashioned as a control device for an internal combustion engine or a transmission of a motor vehicle.

Electronic device 100 has a memory 104 that can be for example a volatile memory (e.g. RAM) or a nonvolatile memory (e.g. EEPROM) or some other memory type, or a mixed form thereof. In memory 104, a computer program 106 is stored, e.g. in the form of a machine code program, i.e. in binary code form. Computer program 106 implements a specifiable algorithm such as a cryptographic method that can be for example an encryption method of the type AES.

In a first step 200 (FIG. 1) of the method according to the present invention, properties of electronic device 100 are evaluated with regard to a susceptibility to side channel attacks and/or fault attacks, and in this way an evaluation result is obtained.

In a second step 210, at least one influencing parameter is selected that has an influence on the susceptibility of electronic device 100 to side channel attacks and/or fault attacks, in particular as a function of the evaluation result from the preceding step 200.

The at least one influencing parameter is then used in step 220 to diversify computer program 106 for computing unit 102. In other words, a plurality of identical devices 100, or their computing units 102, can each be equipped with software that is functionally identical but that is of a different type in each case with regard to a susceptibility to side channel attacks and/or fault attacks, so that e.g. a successful side channel attack cannot easily be transferred from a first device 100, having a first computer program 106 obtained according to the present invention, to a second device having a diversified variant of computer program 106 also obtained according to the present invention.

Figure 2:
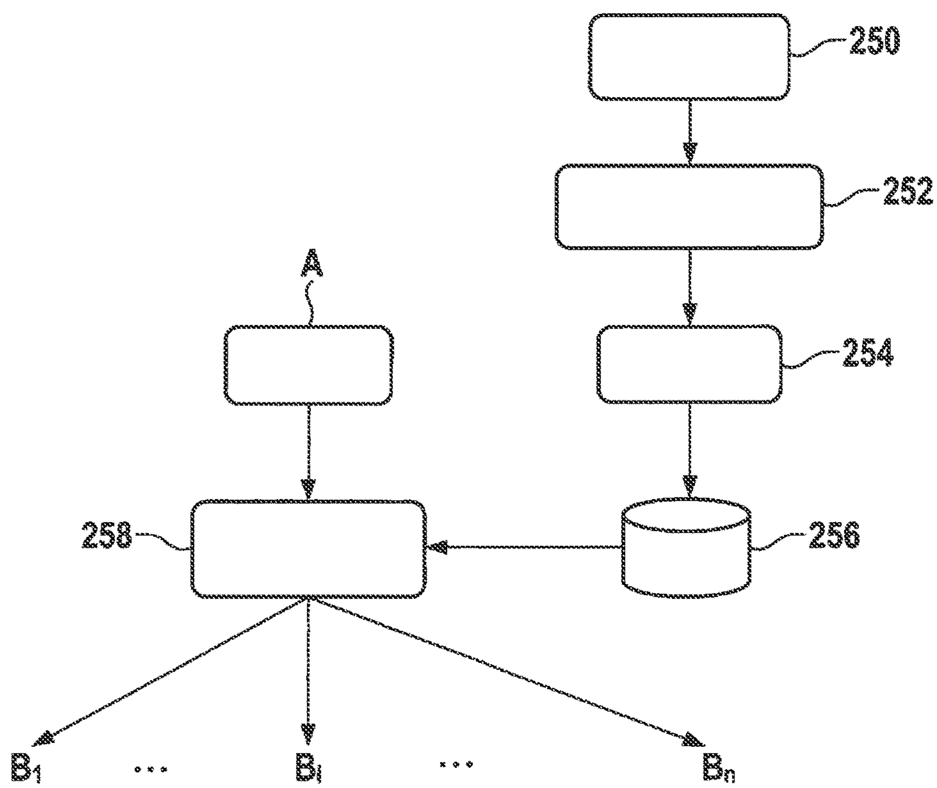
FIG. 2 schematically shows a flow diagram of a further specific embodiment.

FIG. 2 schematically shows a flow diagram of a further specific embodiment of the present invention. In step 250, a target system 100 is specified, i.e. for example the hardware of device 100 (FIG. 4), as defined by, for example, the type of computing unit 102 and/or of memory 104.

In step 252 (FIG. 2), analogous to step 200 of the specific embodiment according to FIG. 1, properties of target system 100 (i.e. of electronic device 100) relating to a susceptibility to side channel attacks and/or fault attacks are evaluated, and in this way an evaluation result is obtained.

In step 254 there takes place the selection of at least one influencing parameter that has an influence on the susceptibility of electronic device 100 to side channel attacks and/or to fault attacks. The selection advantageously takes place in particular as a function of the evaluation result from the preceding step 252. In an advantageous specific embodiment, possible influencing parameters can be contained in parameter database 256 and taken therefrom for the selection 254.

Figure 4:
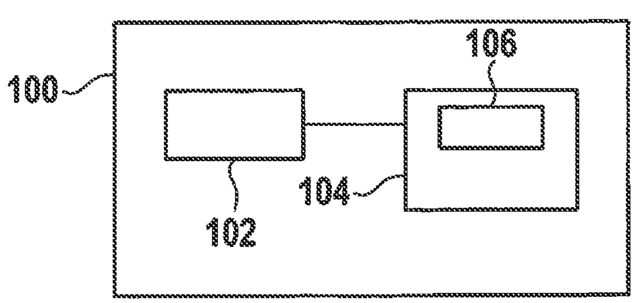
FIG. 4 schematically shows a block diagram of a specific embodiment of a device according to the present invention.

Subsequently, analogous to step 220 of the specific embodiment according to FIG. 1, in step 258 there takes place a diversification of computer program 106 for computing unit 102 (FIG. 4). That is, computer program 106 is produced as a function of a specifiable algorithm A that is to be implemented, and preferably a plurality of different variants B1, Bi, Bn (where i>1, n>i) of machine code programs are produced for computing unit 102, all variants preferably implementing algorithm A and having a largely identical functionality, but causing a possibly different susceptibility of electronic device 100 to side channel attacks and/or fault attacks due to the diversification 258 according to the present invention.

Figure 3:
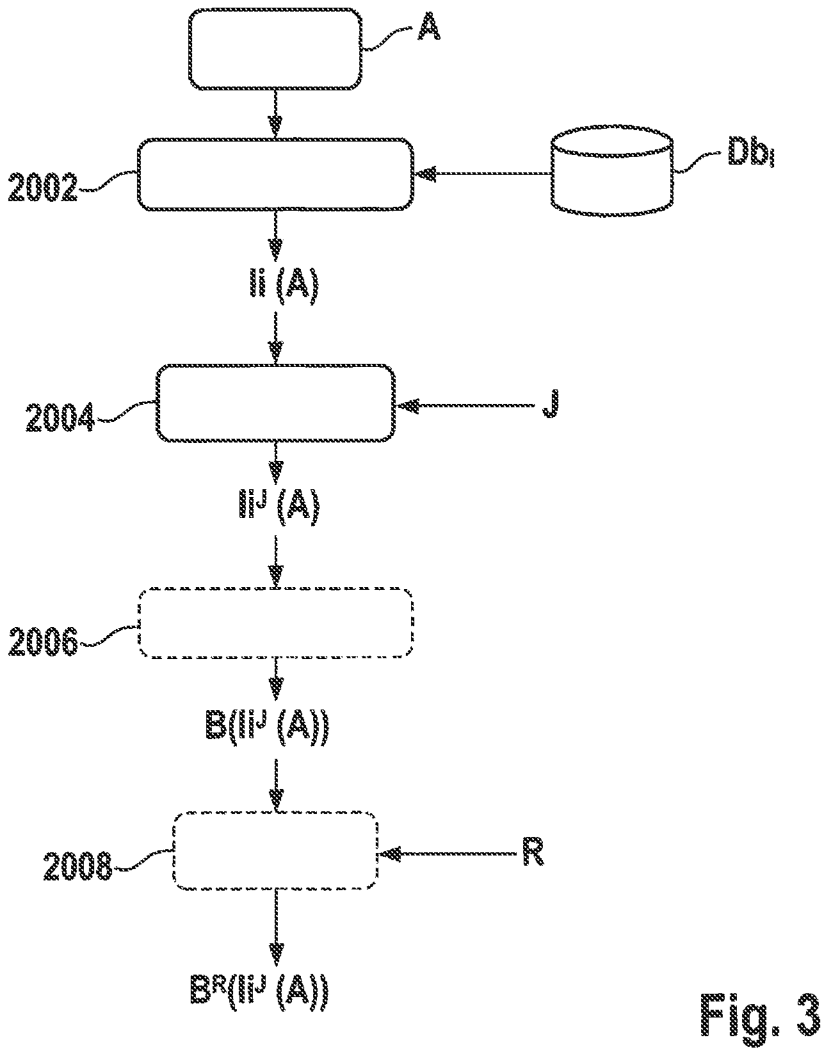
FIG. 3 schematically shows a simplified flow diagram according to a further specific embodiment of the method according to the present invention.

FIG. 3 schematically shows a simplified flow diagram according to a further specific embodiment of the method according to the present invention. Analogous to the method according to FIG. 2, again an algorithm A, for example a cryptographic algorithm, is to be implemented on target system 100 (FIG. 4). In a first step 2002, there takes place a selection of an implementation for the specifiable algorithm A, the selection 2002 of the implementation in particular taking place in random or pseudo-random fashion or as a function of at least one first selection parameter, for example as a function of an (unambiguous) serial number of target system 100 or of the computer program to be provided. Step 2002 can also include the querying of an implementation database Db1 that contains information about various possible implementations of algorithm A. As the initial quantity of step 2002, an i-th implementation Ii(A) of algorithm A is obtained.

In the following step 2004 there takes place the selection of a compiling parameter J, the compiling parameter being included during a compiling of the computer program, the selection 2004 of the compiling parameter taking place in particular in random or pseudo-random fashion, or as a function of at least one second selection parameter (for example as a function of an (unambiguous) serial number of target system 100 or of the computer program to be provided). Particularly preferably, instead of a compiling parameter in step 2004 a set of a plurality of compiling parameters can also be selected.

For example, a compiling parameter can be formed by a counter value or a datum that is used for the compiling of the source code of computer program 106, and that modifies the physically observable operating behavior of computer program 106 when running on computing unit 102 (for example temporal behavior during the program sequence and/or temporal run of the electrical energy consumption of computing unit 102 during the running of computer program 106 on computing unit 102), in particular with regard to a side channel leakage or a reaction to fault attacks.

If, for example, the i-th implementation Ii(A) of algorithm A contains a delay statement, for example the halting of a program execution (e.g. via an assembler statement "NOP"—"no operation"), or a loop execution for a specifiable time, the value for the specifiable time that is selected and used for the compiling can be a compiling parameter in the sense of the present specific embodiment.

A further example for possible compiling parameters or their use in the sense of the present invention is a set of values (which can also be designated dummy values) or their processing, which has no influence on the functioning of the computer program with regard to the implementation of the algorithm, but which masks for example the electrical energy consumption actually required by the processing of other parts (i-th implementation Ii(A) of algorithm A) of the computer program.

The initial quantity of step 2004 is the i-th implementation Ii(A) of algorithm A, parameterized with compiling parameter or parameters J, designated below as $Ii^J(A)$.

The following step 2006, which is preferably optional, provides a selection of a compiling method for the compiling of computer program 106, selection 2006 of the compiling method taking place in particular in random or pseudo-random fashion, or as a function of at least one third selection parameter (for example as a function of an (unambiguous) serial number of target system 100 or of the computer program to be provided).

In the present context, a compiling method is understood to be any possible compiler switch (software switch that controls an operating method of the compiler software, e.g. degree of numerical optimization, provision of debugging information, use of particular hardware functionalities built into the computing unit (hardware-based AES support), the version of software libraries used that are included in the machine code program to be produced), as well as all other measures that influence the compiling of a source code of computer program 106 or the linking (binding) of individual program modules in such a way that in each case a different type of machine code program $B(Ii^J(A))$ is obtained.

In a further specific embodiment, a further step 2008 is optionally provided that has as its subject matter the selection of at least one runtime parameter R for an execution of computer program 106 (in the form of machine code program $B(Ii^J(A))$) on computing unit 102, selection 2008 of the at least one runtime parameter taking place in particular in random or pseudo-random fashion or as a function of at least one fourth selection parameter. Step 2008 can preferably be executed when device 100 provided with computer program 106, or machine code program $B(Ii^J(A))$, is in the field, that is for example installed in a target system such as a motor vehicle in the case of the realization of device 100 as a control device for a motor vehicle.

In a further advantageous specific embodiment, runtime parameters R can contribute to the software diversification in a manner similar to selection 2006 of the compiling method. For example, a particular runtime parameter r can indicate a delay value in the execution of computer program 106 on computing unit 102. In contrast to selection 2006 of the compiling method executed during the production or provision of the computer program, runtime parameter r can however advantageously first be indicated at the runtime of the computer program on computing unit 102, i.e. for a user of device 100 in the field, so that a production process, or the producer of device 100, does not have any influence on runtime parameter r. In this way it is ensured that device 100, or software 106 situated thereon, can still be meaningfully hardenable through diversification against side channel attacks or fault attacks even when the steps 2002 through 2006, possibly done at a producer of device 100, or the parameters selected in the steps, are known to an attacker.

As initial quantity of step 2008, the parameterized binary data $B^R(Ii^J(A))$ are obtained.

It has already been mentioned above that steps 2006, 2008 are optional. It is also conceivable to make step 2004 optional.

The present invention has in particular as its object the increasing of the costs or the outlay for the transferring of side channel attacks or fault attacks from a first device 100 to a second device 100. Because different devices 100 according to the present invention have different properties relating to a susceptibility to side channel attacks and/or fault attacks, on the basis of the diversification of their computer programs 106, such attacks cannot easily be transferred or reproduced from one device 100 to another device 100. Given the use of runtime parameters that can change over time, it is even possible to control or to modify, at different times, a susceptibility of a particular device 100 against side channel attacks and/or fault attacks. In addition, the approach according to the present invention can be combined as desired with conventional methods for hardening devices against side channel attacks and/or fault attacks.

Figure 5:
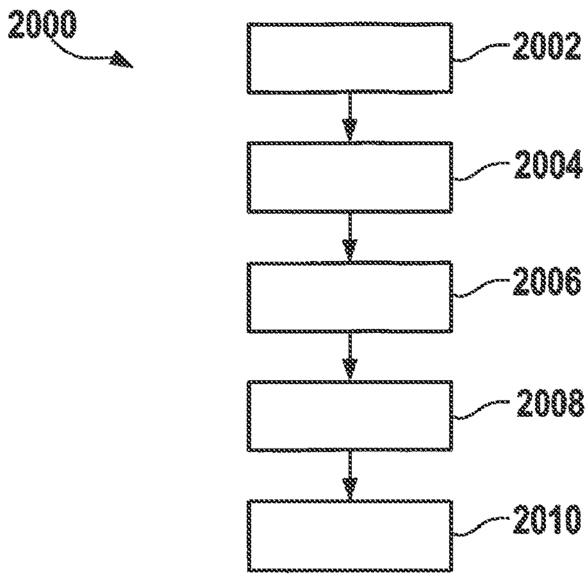
FIG. 5 schematically shows a simplified flow diagram according to a further specific embodiment of the method according to the present invention.

FIG. 5 schematically shows a simplified flow diagram record to a further specific embodiment of the method according to the present invention. Steps 2002 through 2008 can be designed and carried out analogous to FIG. 3. In addition, step 2010 defines the production of at least two different machine code programs that both have the same functionality regarding algorithm A that is to be implemented (FIG. 3), but that differ from one another with regard to their side channel leakage and/or reactions to fault attacks.

Figure 6:
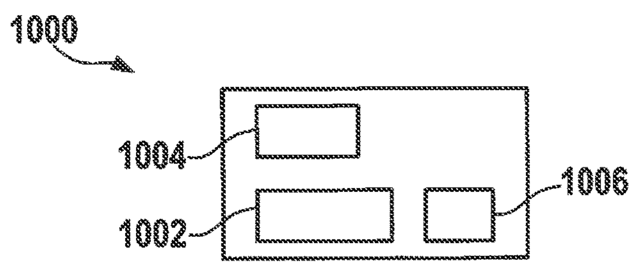
FIG. 6 schematically shows a block diagram of a specific embodiment of a device according to the present invention.

FIG. 6 schematically shows a block diagram of a specific embodiment of a device 1000 according to the present invention for providing a computer program for a computing unit 102 of an electronic device 100, in particular a control device of a motor vehicle or of a household appliance. Device 1000 is fashioned to execute the following steps: evaluation 200 (FIG. 2) of properties of electronic device 100 relating to a susceptibility to side channel attacks and/or fault attacks, an evaluation result being obtained; selection 210 of at least one influencing parameter that has an influence on the susceptibility of electronic device 100 to side channel attacks and/or fault attacks, in particular as a function of the evaluation result; use 220 of the at least one influencing parameter to diversify 2000 the computer program for computing unit 102; see FIG. 5. In particular, device 1000 can also be fashioned to execute the method according to FIG. 2, FIG. 5.

For example, device 1000 according to the present invention can likewise have a computing unit 1002 or a computer, e.g. a personal computer, for executing the steps according to the present invention. The evaluation step 200 can for example be executed particularly efficiently, in particular automatically (without interaction with a human operator) if the properties that are to be evaluated of electronic device 100 (FIG. 3) relating to a susceptibility to side channel attacks and/or fault attacks are described in a formalized manner and can accordingly be evaluated by machine. For this purpose, for example data can be used that characterize a layout of a circuit board that has computing unit 102. These data can be stored in a (local or external) database 1004. In addition, the influencing parameter or parameters can be contained in a parameter database 1006. It is also conceivable to provide an expert system that provides the information relevant for the steps of evaluation and selection for automated processing.

Figure 7:
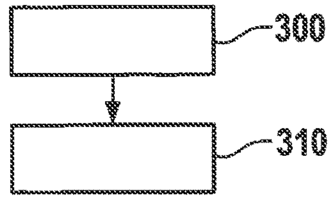
FIG. 7 schematically shows a simplified flow diagram according to a further specific embodiment of the method according to the present invention.

A further solution of the object of the present invention is indicated by a method for operating an electronic device 100 that has a computing unit 102 for executing a computer program 106, characterized by the following steps: selection 300 (FIG. 7) of at least one runtime parameter for an execution of computer program 106 on computing unit 102 that has an influence on the susceptibility of electronic device 100 to side channel attacks and/or fault attacks, the selection of the at least one runtime parameter taking place in particular in random or pseudo-random fashion or as a function of at least one fifth selection parameter; execution 310 of computer program 106 with the at least one runtime parameter. In this variant of the invention, the computer program, or its binary form (machine code program), is designed to evaluate at least one runtime parameter that has an influence on the susceptibility of electronic device 100 to side channel attacks and/or fault attacks, or computer program 106, or its binary form (machine code program) is designed to change its execution behavior as a function of the at least one runtime parameter in such a way that a susceptibility to side channel attacks and/or fault attacks is modified. This variant of the invention, like those variants that have as their subject matter a patching of the machine code program, can advantageously be executed in the field, or during a use of electronic device 100 in a target system.

In comparison to conventional approaches, the design of the present invention has the following advantages: lower additional outlay for realization of the invention; the invention can be used in stock devices 100, and in particular does not require any modifications of the hardware or the provision of additional components such as random number generators; easy combination with existing (counter-) measures for SCA hardening, e.g. using masking or hiding of data.

What is claimed is:

1. A method for providing a computer program of a computing unit of an electronic device, the method comprising:

evaluating properties of the electronic device relating to a susceptibility to side channel attacks and/or fault attacks, as a result of which an evaluation result is obtained; and selecting at least one influencing parameter that has an influence on the susceptibility of the electronic device to side channel attacks and/or fault attacks as a function of the evaluation result;

wherein the at least one influencing parameter is used to diversify the computer program for the computing unit;

wherein the diversification includes:

selecting a compiling parameter, the compiling parameter being included during a compiling of the computer program, the selection of the compiling parameter taking place in particular in random or pseudo-random fashion or as a function of at least one second selection parameter, and selecting a compiling method for the compiling of the computer program, the selection of the compiling method taking place in particular in random or pseudo-random fashion or as a function of at least one third selection parameter; and wherein the method further includes compiling the computer program using the selected compiling parameter and the selected compiling method.

2. The method of claim 1, wherein the evaluating includes a systematic evaluation of the electronic device relating to a susceptibility to side channel attacks and/or fault attacks, and also including an evaluation of discovered susceptibilities.

3. The method of claim 1, wherein the influencing parameter includes at least one parameter from the following list: a parameter characterizing the architecture of the electronic device or the architecture of the computing unit, a parameter characterizing the implementation level of the electronic device or the computing unit, a parameter characterizing the production of the computer program.

4. The method of claim 1, wherein the computer program is configured to implement a specifiable algorithm, and wherein the diversification includes: production of at least two different machine code programs that have the same functionality relating to the algorithm that is to be implemented, but that differ from one another with regard to their side channel leakage and/or reactions to fault attacks.

5. The method as recited in claim 1, further comprising installing provided machine code of the computer program in a motor vehicle, the machine code being installed in a control device of a motor vehicle.

6. A method for providing a computer program of a computing unit of an electronic device, the method comprising:

evaluating properties of the electronic device relating to a susceptibility to side channel attacks and/or fault attacks, as a result of which an evaluation result is obtained; and selecting at least one influencing parameter that has an influence on the susceptibility of the electronic device to side channel attacks and/or fault attacks as a function of the evaluation result;

wherein the at least one influencing parameter is used to diversify the computer program for the computing unit;

wherein the diversification includes:

selecting an implementation for an algorithm of the computer program, the selection of the implementation taking place in random or pseudo-random fashion;

selecting a compiling parameter, the compiling parameter being included during a compiling of the computer program, the selection of the compiling parameter taking place in particular in random or pseudo-random fashion or as a function of at least one second selection parameter; and selecting a compiling method for the compiling of the computer program, the selection of the compiling method taking place in particular in random or pseudo-random fashion or as a function of at least one third selection parameter; and wherein the method further includes compiling the computer program using the selected compiling parameter and the selected compiling method, and based on the compiling, providing machine code of the computer program including the selected implementation of the algorithm.

7. The method as recited in claim 6, further comprising:

installing the provided machine code of the computer program including the selected implementation of the algorithm in a motor vehicle, the machine code of the computer program including the selected implementation of the algorithm being installed in a control device of a motor vehicle.

8. A method for producing an electronic device, the method comprising:

providing the electronic device with a computing unit for executing a computer program; and providing the computer program of the computing unit of the electronic device, by performing the following:

evaluating properties of the electronic device relating to a susceptibility to side channel attacks and/or fault attacks, as a result of which an evaluation result is obtained; and selecting at least one influencing parameter that has an influence on the susceptibility of the electronic device to side channel attacks and/or fault attacks, in particular as a function of the evaluation result;

wherein the at least one influencing parameter is used to diversify the computer program for the computing unit;

wherein the diversification includes:

selecting a compiling parameter, the compiling parameter being included during a compiling of the computer program, the selection of the compiling parameter taking place in particular in random or pseudo-random fashion or as a function of at least one second selection parameter, and selecting a compiling method for the compiling of the computer program, the selection of the compiling method taking place in particular in random or pseudo-random fashion or as a function of at least one third selection parameter; and wherein the method further includes compiling the computer program using the selected compiling parameter and the selected compiling method.

9. A device for providing a computer program for a computing unit of an electronic device, wherein the device comprises:

a computer including hardware, the computer configured to perform the following:

evaluating properties of the electronic device relating to a susceptibility to side channel attacks and/or fault attacks, as a result of which an evaluation result is obtained; and selecting at least one influencing parameter that has an influence on the susceptibility of the electronic device to side channel attacks and/or fault attacks, in particular as a function of the evaluation result;

wherein the at least one influencing parameter is sued to diversify the computer program for the computing unit;

wherein the diversification includes:

selecting a compiling parameter, the compiling parameter being included during a compiling of the computer program, the selection of the compiling parameter taking place in particular in random or pseudo-random fashion or as a function of at least one second selection parameter, and selecting a compiling method for the compiling of the computer program, the selection of the compiling method taking place in particular in random or pseudo-random fashion or as a function of at least one third selection parameter; and wherein the computer is further configured to perform compiling the computer program using the selected compiling parameter and the selected compiling method.

10. The device of claim 9, wherein the evaluating includes a systematic evaluation of the electronic device relating to a susceptibility to side channel attacks and/or fault attacks, and also including an evaluation of discovered susceptibilities.

11. An electronic device, comprising:

a computing unit including hardware; and at least one computer program for the computing unit that is executable on the computing unit;

wherein at least one computer program of the computing unit is provided by performing the following:

evaluating properties of the electronic device relating to a susceptibility to side channel attacks and/or fault attacks, as a result of which an evaluation result is obtained; and selecting at least one influencing parameter that has an influence on the susceptibility of the electronic device to side channel attacks and/or fault attacks, in particular as a function of the evaluation result;

wherein the at least one influencing parameter is used to diversify the computer program for the computing unit;

wherein the diversification includes:

selecting a compiling parameter, the compiling parameter being included during a compiling of the computer program, the selection of the compiling parameter taking place in particular in random or pseudo-random fashion or as a function of at least one second selection parameter, and selecting a compiling method for the compiling of the computer program, the selection of the compiling method taking place in particular in random or pseudo-random fashion or as a function of at least one third selection parameter; and wherein the computer program is further provided by performing: compiling the computer program using the selected compiling parameter and the selected compiling method.

12. The electronic device as recited in claim 11, wherein the computing unit is a microcontroller, or a microprocessor, or a processor, or a digital signal processor, or a field programmable gate array configured as a processor.

13. The electronic device as recited in claim 11, wherein the electronic device is installed in a motor vehicle.

* * * * *